Aug. 20, 1957         G. F. BODONI, JR         2,803,410
ICE CRUSHING DEVICE CAPABLE OF PRODUCING TWO SIZES OF
CRUSHED ICE, DEPENDENT UPON THE DIRECTION OF ROTATION
Filed Aug. 4, 1955                                       2 Sheets—Sheet 1
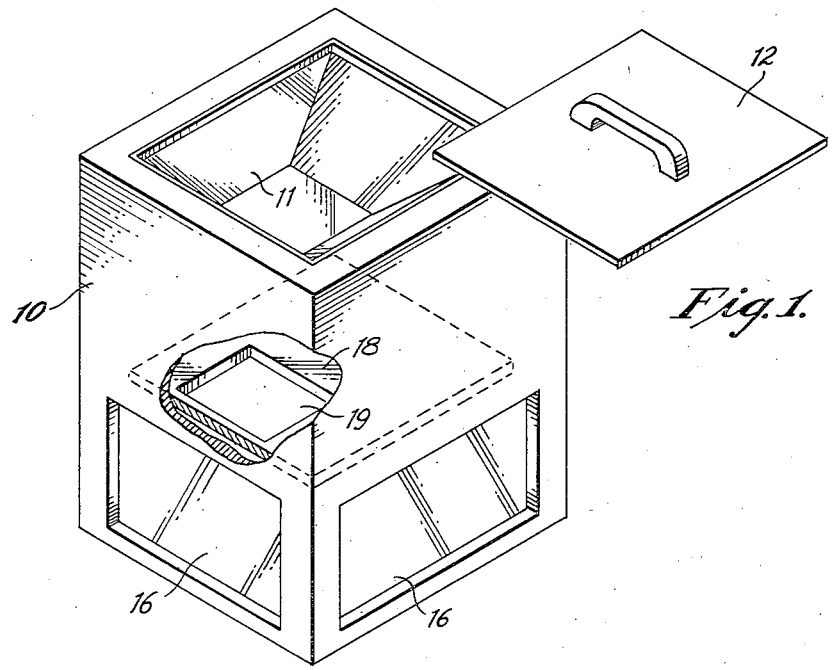
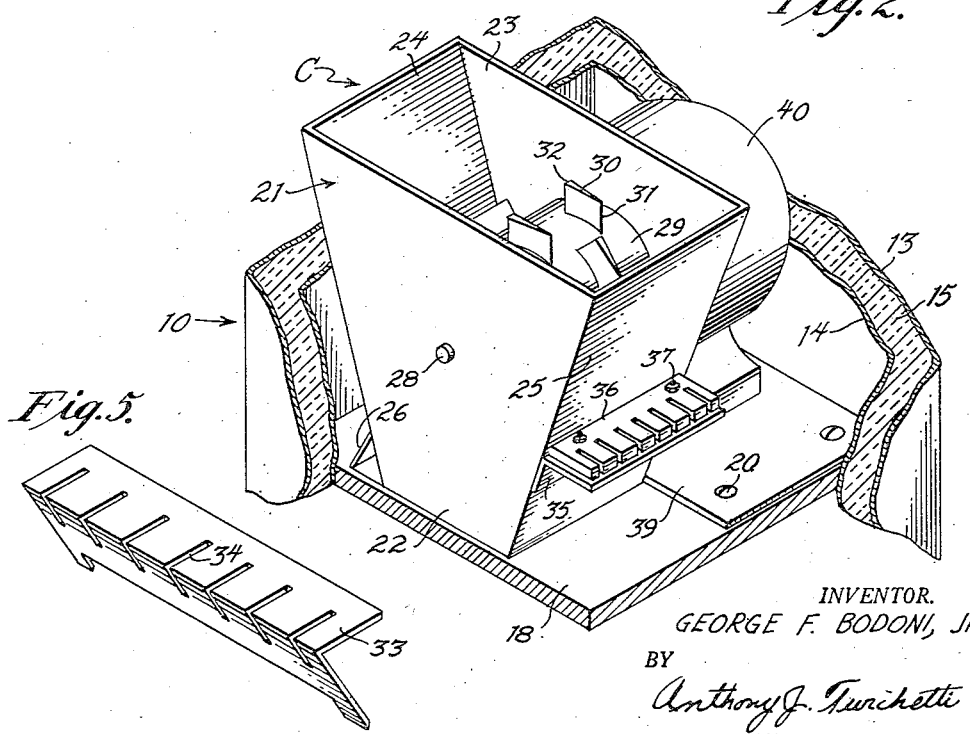
INVENTOR.
GEORGE F. BODONI, JR.
BY
Anthony J. Turchetti
HIS ATTORNEY.

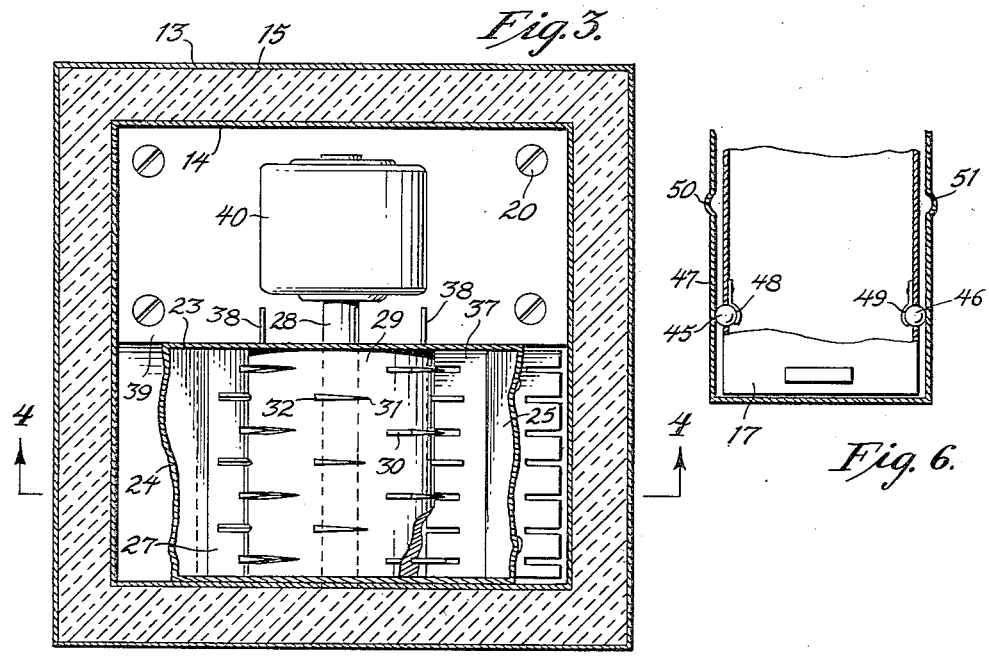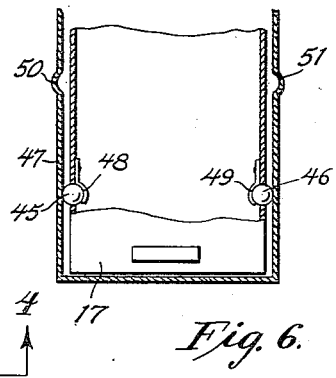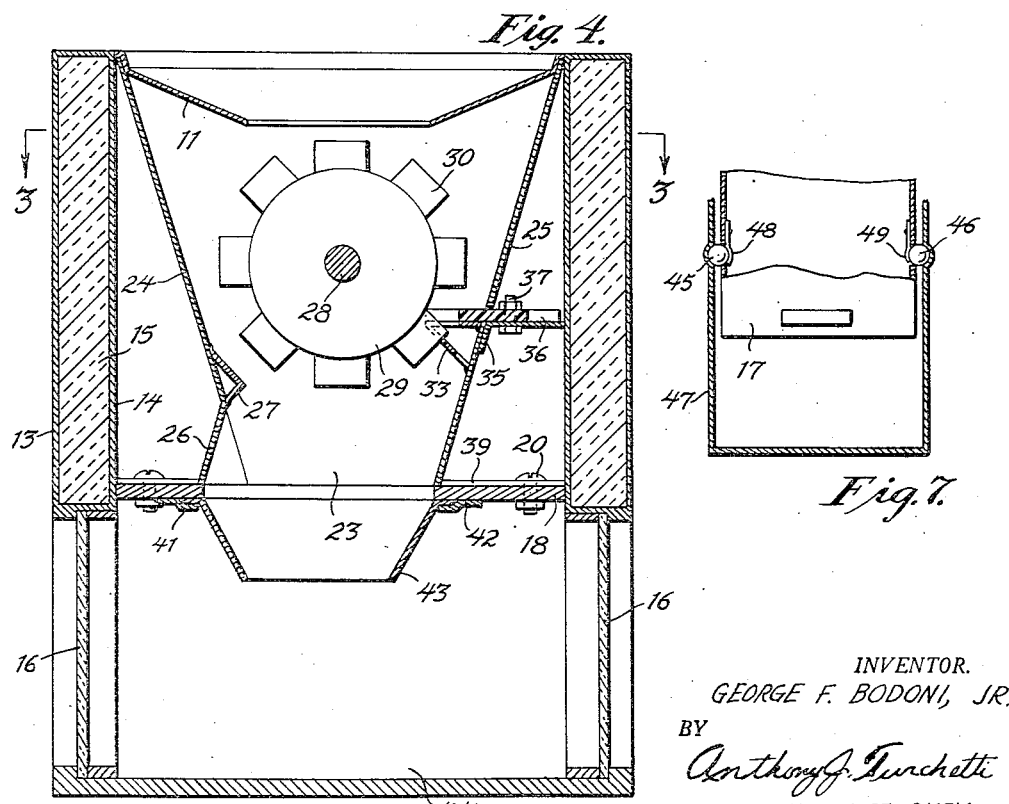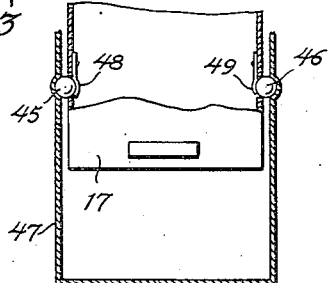

United States Patent Office 2,803,410
Patented Aug. 20, 1957

2,803,410

ICE CRUSHING DEVICE CAPABLE OF PRODUCING TWO SIZES OF CRUSHED ICE, DEPENDENT UPON THE DIRECTION OF ROTATION

George F. Bodoni, Jr., Philadelphia, Pa., assignor to 4 Bros. Refrigeration Mfg. Co., Inc., a corporation of Pennsylvania Application August 4, 1955, Serial No. 526,522

4 Claims. (Cl. 241—190)

This invention relates to ice crushing devices, and particularly to an ice crushing device which is capable of producing two sizes of crushed ice.

There are many ice crushing machines presently available on the market for producing crushed ice for various uses. Some produce chipped ice pellets while others produce shaved ice. But each of these machines produces only one size of ice chips. Thus, if a user has the need for two sizes of ice chips, as in the case of a restaurateur who uses chipped ice pellets for appetizers and shaved ice for mixed drinks, it would be necessary for him to have separate machines for producing each size of ice chips.

With the above in mind, it is the foremost objective of the present invention to provide an improved ice crushing device.

It is another object of this invention to provide an improved ice crushing device which is capable of producing both chipped ice pellets and shaved ice, as desired.

It is a further object of the present invention to provide an ice crushing device which can produce ice pellets and shaved ice without the necessity of changing parts in the machine to accomplish such purpose.

Another object of this invention is to provide an ice crushing device which is compact.

A further object of this invention is to provide an improved ice crushing device of the type aforesaid which is simple in construction and economical.

These objects, together with other objectives and advantages to be derived from the present invention, will at once become apparent from the following detailed description and accompanying drawings, wherein similar numerals refer to similar parts throughout the several views.

Figure 1 is a perspective view of the housing of the present invention, with the cover shown in exploded relationship therewith.

Figure 2 is a perspective view, with parts broken away, of the crushing mechanism of the present invention, shown mounted within the housing of Fig. 1.

Figure 3 is a horizontal cross-sectional view of the present ice crushing device, taken along the line 3—3 of Fig. 4, so as to show in plan form the working parts of the crushing mechanism.

Figure 4 is a vertical sectional view of the ice crushing device taken along the line 4—4 of Fig. 3.

Figure 5 is a perspective view of a support member for the comb used for producing shaved ice.

Figure 6 is a diagrammatic view of the housing door in the closed position.

Figure 7 is a diagrammatic view of the housing door in the open position, illustrating the means by which the door is maintained in the open position.

Referring to the drawings, and particularly Fig. 1 thereof, 10 represents the housing for the present ice crushing device, and as can be seen, said housing is boxlike in configuration and is provided with an open top in which removably resides a hopper 11 having an opening therein. Said open top is normally closed by a lid 12. The walls of the housing 10 are preferably made from aluminum sheet; and as indicated in Fig. 2, said walls consist of two layers 13 and 14 of such sheet separated by a suitable insulator 15, such as glass fiber mat or the like. Three walls of the housing 10 are provided with windows 16 in the lower portion thereof, while the fourth wall contains an access door 17 shown diagrammatically in Figs. 6 and 7. Although not shown as such, the windows 16 may be of a double pane construction separated by a dead air space for insulation purposes. Mounted within the housing 10 adjacent to the upper edge of the windows 16, is a platform 18 which has an opening 19 therein in substantial alignment with the opening of the hopper 11, for a purpose to be described below.

Fixedly mounted on the platform 18, by means of bolts 20, is the cutting or crushing mechanism C of the present ice crushing device, as shown in Fig. 2. This mechanism C consists of a four-sided rectangular funnel 21 made from stainless steel, two sides 22 and 23 of which lie in parallel relationship to one another, with the remaining two sides 24 and 25 lying in converging relationship. The bottom of the side 24 is flared outwardly as shown at 26 in Fig. 4, for a purpose to be described below. Fixedly attached to the side 24 on the inside of the funnel 21, adjacent to the flared portion 26, is a stainless steel angle member 27 which extends across the width of said side, as shown in Fig. 4.

Residing within the funnel 21, and rotatably carried by a shaft 28 which is journalled in the parallel sides 22 and 23, is an aluminum cylinder 29. Mounted about the surface of the cylinder 29, in spaced relationship to one another, is a plurality of stainless steel cutting knives 30. The knives 30 are staggered about said cylinder 29 and are preferably spaced about ⅜ inch apart, measured axially of the cylinder. As will be noted from Figs. 2 and 3, each knife 30 has a sharp edge 31 and a blunt edge 32, for a purpose to be described below. The cylinder 29 is so mounted within the funnel 21 that a gap of approximately ½ inch exists between the blades 30 and the angle member 27, as shown in Fig. 4.

Mounted on the side 25 on the inside of the funnel 21 is an angular support bracket 33 made from stainless steel and having a plurality of spaced slots 34 therein. The bracket 33 lies slightly above the position of the angle member 27 as shown in Fig. 4. Mounted on the opposite surface of the side 25 is a bracket 35 which lies in substantial alignment with the bracket 33. A slotted comb 36 is detachably attached to the bracket 35 and projects into the interior of the funnel 21 through an opening provided therefor in the side 25, with its projecting edge being supported by the angular support bracket 33. It will be noted that the slots of the comb 36 align with the slots 34 of the support bracket 33, and that the knives 30 are in alignment with said slots. The angular support bracket 33 and the comb 36 project sufficiently into the interior of the funnel 21 so as to lie in the path of the blades 30, which are intended to pass through the said comb and slots 34 of the support bracket 33, as the cylinder 29 rotates. This is depicted clearly in Figs. 3 and 4. The comb 36 is preferably made from a semi-rigid material such as nylon or neoprene, or the like. It will be noted from Figs. 2 and 3 that both edges of the comb 36 are slotted, so that said comb may be reversed when one edge thereof becomes worn. The comb is attached to the bracket 35 by means of bolts 37.

Fixedly attached to the funnel 21 at the bottom thereof, and structurally reinforced by means of webs 38 is a motor plate 39 which carries electric motor 40, which drives the shaft 28 on which the cylinder 29 is mounted. The rotor of the electric motor 40 is adapted to rotate in two directions and may be controlled in this respect by means of a double switch (not shown).

As has been pointed out above, the cutting mechanism C is fixedly attached to the platform 18 by means of bolts 20. As shown in Figs. 2 and 4, said bolts pass through the motor plate 39 and platform 18; but if desired, the bolts may be made to pass through the base of the motor 40 so as to simultaneously secure the motor to the motor plate while at the same time fixing the motor plate and funnel to the platform 18. It will be noted that the cutting mechanism is positioned on the platform so that the upper end of the funnel 21 resides beneath the opening of the hopper 11 and the lower end thereof lies directly above the opening 19 in the platform 18, in the manner shown in Fig. 4. It will be also be seen from Fig. 4 that tracks 41 and 42 are attached to the underside of the platform 18 adjacent to the opening 19 therein, which tracks slidably receive conical funnel section 43. Said conical funnel section is adapted to convey the ice chips into the receiving chamber 44 below, as they issue forth from the cutting mechanism C.

The access door 17 for gaining access into the interior of the receiving chamber 44 is shown diagrammatically in Figs. 6 and 7. This door is installed in one of the walls of the housing 10, and preferably in that wall remote from the opening 19 of the platform 18. As shown, the door 17 carries a pair of opposed steel balls 45 and 46 along its vertical edges which project through openings in said edges into rolling contact with the surface of the door frame 47. Said balls are maintained in such contact by means of springs 48 and 49, respectively. The upper portion of the door frame 47 is provided with opposed sockets 50 and 51. Thus, when the door 17 is raised, the balls 45 and 46 are forced into the sockets 50 and 51, respectively, under the action of springs 48 and 49, maintaining said door in a raised position, as shown in Fig. 7.

*Operation*

Although the operation of the present ice crushing device should be quite apparent from the above description of its various parts and their relationship to one another, a brief discussion of its operation will be given below for the sake of clarity and completeness.

When it is desired to crush ice into pellets, or to produce shaved ice, large pieces of ice or ice cubes are placed in the hopper 11 so as to pass through the opening therein into the funnel 21 lying therebeneath, coming to rest upon the cylinder 29 and the blades 30. The lid 12 is then inserted in place over the hopper 11, and the motor 40 is started by a mere flip of the control switch. It will be remembered that the motor is controlled from a double switch so that the rotor thereof may be made to turn in two directions. Looking now at Figs. 2–4, it will be seen that if the motor rotor is made to turn in a clockwise direction, as shown, driving the cylinder 29 in the same direction, the sharp edge 31 of the blades 30 will pass downwardly through the slots in the comb 36 and support bracket 33, said bracket preventing undue distortion of the comb. The blades 30 will simultaneously reduce the ice pieces or ice cubes in size as they come into contact therewith, the smaller pieces being forced through the slots in the comb 36 and support bracket 33 together with the blades 30 as they pass therethrough, producing shaved ice. The ice pieces will also be reduced in size due to their bombardment against the sides of the funnel 21 under the turbulent action of the rotating cylinder 29 and blades 30 coming into contact therewith.

If the motor switch is reversed, so that its rotor will travel in a counterclockwise direction, the ice pieces will be bombarded against the side 24 of the funnel 21 and simultaneously "cracked" by the blunt edge 32 of the blades 30. As these cracked pieces descend through the funnel, they are further reduced in size when they contact the angle member 27 which projects them into the path of the rotating knives 30 where they are again acted upon by the blunt edge of the knives, producing ice pellets ¼–⅜ inch in size.

The flared portion 26 of the funnel side 24 prevents clogging of the chipped ice in the bottom of the funnel so that it passes freely through the opening 19 in the platform 18. The conical funnel section 43 then conveys the chipped ice into the receiving chamber 44 into a neat pile, ready for use. Due to the finely divided nature of the ice chips produced, the insulated walls of the housing 10 are considerably important in preventing the melting of said chips before they may be used.

When ice chips are desired, one need merely raise the door 17, in the manner described above, until the balls 45 and 46 are seated in the sockets 50 and 51 whereupon the door will remain in a raised position. After the desired quantity of ice chips is obtained, a downward pressure on the door handle will disengage the balls from their sockets, and the door may be lowered to a closed position.

It is seen from the above description of the present invention that a novel and extremely useful ice crushing device is prvoided by the present structure which eliminates the necessity of having more than one such device on hand to produce both ice pellets and shaved ice. Nor is it necessary to change parts in the device to accomplish this result. Instead, such result may be achieved in the present device by a mere flip of a switch. It will also be been that due to the comparatively simple nature of this device, it may be easily disassembled for cleaning. In addition, its simplicity results in economy of construction, which is an attractive feature to both the manufacturer and the buyer.

Although the present discussion of this invention has been limited to the above-described preferred embodiment, variations thereof are possible without departing from the spirit of the invention. It is to be understood, therefore, that the invention is not to be limited to the particular embodiment disclosed, but rather only to the inventive concept as defined by the appended claims.

What is claimed is:

1. An ice crushing device comprising, a housing having an open top, a hopper residing in said open top and having an opening therein, a platform mounted within said housing beneath said hopper, said platform having an aperture in vertical alignment with the opening of said hopper, a rectangular funnel mounted on said platform in direct alignment with said hopper opening and platform aperture, said funnel having opposed parallel sides and opposed converging sides, a cylinder rotatably mounted within said funnel between said opposed parallel sides, a plurality of knives on the surface of said cylinder in staggered relationship to one another, said knives each having a sharp edge and a blunt edge, a toothed member within said funnel on one of said converging sides, said toothed member being so positioned relative to said cylinder as to enable the knives to pass through the interstices thereof, and means for causing the rotation of said cylinder in two directions.

2. An ice crushing device comprising, a boxlike housing having an open top, a hopper residing in said open top and having an opening therein, a platform mounted within said housing beneath said hopper in spaced relationship therewith, said platform having an aperture in vertical alignment with the opening of said hopper, a rectangular funnel mounted on said platform in direct alignment with said hopper opening and platform aperture, said funnel having opposed parallel sides and opposed converging sides, a cylinder rotatably mounted within said funnel between said opposed parallel sides, a plurality of knives on the surface of said cylinder in staggered relationship to one another, said knives each having a sharp edge and a blunt edge, a toothed member within said funnel on one of said converging sides, said toothed member being so positioned relative to said cylinder as to enable the knives to pass through the interstices thereof, an ice deflecting member on the opposite converging side of said funnel and lying below said cylinder, the lower portion of one of said converging sides being flared outwardly in a direction away from its direction of convergence, and means for causing the rotation of said cylinder in two directions.

3. An ice crushing device comprising, a boxlike housing having an open top, a hopper residing within said open top and having an opening therein, a platform mounted within said housing beneath said hopper in spaced relationship therewith, said platform having an aperture in vertical alignment with the opening of said hopper, a rectangular funnel mounted on said platform in direct alignment with said hopper opening and platform aperture, said funnel having opposed parallel sides and opposed converging sides, a cylinder rotatably mounted within said funnel between said opposed parallel sides, a plurality of knives on the surface of said cylinder in staggered relationship to one another, said knives each having a sharp edge and a blunt edge, one of said converging sides having a lateral opening therein, a toothed member extending part way through said lateral opening into the interior of said funnel, said member having teeth on a pair of opposed edges, support brackets for said toothed member on said converging side adjacent to said lateral opening, said toothed member being so positioned relative to said cylinder as to enable the knives to pass through the interstices thereof, an ice deflecting member lying in spaced relationship to the knives on said cylinder on the opposite converging side of said funnel, said deflecting member lying below said cylinder, the lower portion of one of said converging sides being flared outwardly in a direction away from its direction of convergence, and means for causing the rotation of said cylinder in two directions.

4. An ice crushing device comprising, a boxlike housing having an open top, said housing having insulated walls consisting of two plies of aluminum sheet separated by a glass fiber mat, a hopper residing within said open top and having an opening therein, a platform mounted within said housing beneath said hopper in spaced relationship therewith, said platform having an aperture in vertical alignment with the opening of said hopper, a rectangular funnel mounted on said platform in direct alignment with said hopper opening and platform aperture, said funnel having opposed parallel sides and opposed converging sides, a cylinder rotatably mounted within said funnel between said opposed parallel sides, a plurality of knives on the surface of said cylinder in staggered relationship to one another, said knives each having a sharp edge and a blunt edge, one of said converging sides having a lateral opening therein, a toothed member extending part way through said lateral opening into the interior of said funnel, said member having teeth on a pair of opposed edges, support brackets for said toothed member on said converging side adjacent to said lateral opening, said toothed member being so positioned relative to said cylinder as to enable the knives to pass through the interstices thereof, an ice deflecting member on the opposite converging side of said funnel and lying below said cylinder, said deflecting member lying in spaced relationship to the knives on said cylinder, the lower portion of one of said converging sides being flared outwardly in a direction away from its direction of convergence, and an electric motor drivably connected to said cylinder and capable of rotating in two directions.

References Cited in the file of this patent

UNITED STATES PATENTS

| 22,515 | Sandford | Jan. 4, 1859 |
| 100,302 | Lyons | Mar. 1, 1870 |
| 704,801 | Hilbert | July 15, 1902 |
| 1,032,081 | Penn | July 9, 1912 |
| 1,131,230 | Giddings | Mar. 9, 1915 |
| 1,190,329 | Schmidt | July 11, 1916 |
| 2,048,509 | Melcher | July 21, 1936 |
| 2,174,461 | Fegley et al. | Sept. 26, 1939 |
| 2,213,166 | Majewski | Aug. 27, 1940 |
| 2,226,741 | Randolph | Dec. 31, 1940 |
| 2,264,049 | Miller | Nov. 25, 1941 |
| 2,325,426 | Rietz | July 27, 1943 |
| 2,646,223 | Quintilian | July 21, 1953 |

FOREIGN PATENTS

| 288,104 | Germany | Oct. 19, 1915 |